| United States Patent [19] | [11] Patent Number: 4,812,514 |
| Priddy et al. | [45] Date of Patent: Mar. 14, 1989 |

[54] POLYMER BLENDS

[75] Inventors: Duane B. Priddy; John R. Schroeder, both of Midland, Mich.

[73] Assignee: The Dow Chemical Company, Midland, Mich.

[21] Appl. No.: 136,049

[22] Filed: Dec. 21, 1987

[51] Int. Cl.$^4$ .............................................. C08L 69/00
[52] U.S. Cl. ........................................ 525/67; 525/92; 525/146
[58] Field of Search ................... 525/67, 146, 468, 92

[56] References Cited

U.S. PATENT DOCUMENTS

| 3,431,224 | 3/1969 | Goldblum | 260/13 |
|---|---|---|---|
| 3,896,185 | 7/1975 | Yonemitsu et al. | 260/873 |
| 3,933,941 | 1/1976 | Yonemitsu et al. | 260/873 |
| 4,226,950 | 10/1980 | Holub et al. | 525/67 |
| 4,317,891 | 3/1982 | Sakano et al. | 525/66 |
| 4,358,563 | 11/1982 | Quinn et al. | 525/146 |
| 4,490,506 | 12/1984 | Sakano et al. | 525/67 |
| 4,491,647 | 1/1985 | Dean | 525/67 |
| 4,628,074 | 12/1986 | Boutni | 525/146 |
| 4,634,737 | 1/1987 | Liu et al. | 525/146 |
| 4,657,973 | 4/1987 | Endo et al. | 525/67 |
| 4,663,399 | 5/1987 | Peters | 525/462 |

*Primary Examiner*—Theodore E. Pertilla
*Attorney, Agent, or Firm*—Price, Henereld, Cooper, DeWitt & Litton

[57] ABSTRACT

Polycarbonate resin compositions are disclosed comprising: (a) a polycarbonate resin; (b) an ABS-type terpolymer; and (c) at least one polyether-polycarbonate-polyether ABA-type triblock copolymer. These compositions are characterized by an improved Izod toughness at lower temperatures.

9 Claims, No Drawings

POLYMER BLENDS

BACKGROUND OF THE INVENTION

The present invention relates to polycarbonate compositions comprising blends of polycarbonate resins and acrylonitrile-butadiene-styrene terpolymer.

Polycarbonates are well known, commercially resinous materials having a variety of applications. Such polycarbonates may be prepared by reacting a dihydric compound, such as 2,2-bis(hydroxy phenyl) propane with a carbonate precursor such as phosgene, in the presence of an acid bonding agent such as sodium hydroxide. The resins are tough, rigid, have high softening temperatures, good impact strength, are usable over wide temperature limits, exhibit good dimensional stability and creep resistance.

Blends comprising polycarbonate resins and acrylonitrile-butadiene-styrene resins are known. For example, Yonemitsu U.S. Pat. No. 3,896,185 discloses molding compositions comprising polycarbonate resins and a rubber-modified chlorinated styrene resin. The chlorinated styrene resin can be a terpolymer of chlorinated styrene, butadiene and acrylonitrile. The blend is said to possess excellent mechanical properties, moldability, impact strength and flame resistance. Holub et al U.S. Pat. No. 4,226,950 discloses thermoplastic molding compositions comprising polycarbonates, an alcohol terminated polyester of neopentyl glycol and adipic acid in admixture with an olefin rubber and a component which can be an acrylonitrile-butadienestyrene resin. The blends are said to have an improved processability and improved impact strength. Dean U.S. Pat. No. 4,491,647 discloses a blend comprising a polycarbonate, a rubber-modified methacrylate resin and an acrylonitrile-butadiene-styrene resin. The blends are said to have a higher degree of compatibility. Sakano et al U.S. Pat. No. 4,490,506 discloses thermoplastic compositions comprising a polycarbonate resin in combination with an acrylonitrile-butadiene-styrene resin having an improved moldability and impact resistance. Sakano U.S. Pat. No. 4,317,891 discloses molding compositions comprising polycarbonate, acrylonitrile-butadiene-styrene, and a polyamide resin composition having improved solid resistance, paintability and moldability.

One problem with such high impact strength polycarbonate blends is that their impact properties deteriorate rapidly at low temperatures, e.g., $-20°$ C. The addition of styrene acrylonitrile graft polycarbonate to ABS and polycarbonate blends have been shown to improve low temperature toughness. Unfortunately, styrene acrylonitrile graft polycarbonates are quite costly to produce.

SUMMARY OF THE INVENTION

In accordance with the present invention, it has been discovered that the addition of at least one polyetherpolycarbonate-polyether ABA-type copolymer to a blend containing at least one polycarbonate resin and at least one diene-aromatic vinyl compound-vinyl cyanide compound resin is effective in upgrading the low temperature impact properties of these blends. A significant advantage to this discovery is that polyether-polycarbonate-polyether triblock copolymers are less costly to produce than styrene acrylonitrile graft polycarbonates.

DESCRIPTION OF THE PREFERRED EMBODIMENT

The polycarbonate resins which form the first component of the compositions of this invention are well known in the art and are generally commercially available materials. These polycarbonates as well as their method of preparation are described in U.S. Pat. Nos. 3,161,615; 3,220,973; 3,312,660; 3,312,659; 3,313,777; 3,666,614 and 3,939,672, among others.

These polycarbonates may be prepared by a variety of conventional and well-known processes which include solvent polymerization, interfacial polymerization, pyridine process, transesterification, and melt polymerization. A convenient process for the preparation of these polycarbonates is the interfacial polymerization process involving the coreaction of at least one dihydric phenol or alcohol with a carbonate precursor. Illustrative and nonlimiting examples of dihydric phenols include 2,2-bis(4-hydroxy phenyl) propane, also known as bisphenol A; bis(4-hydroxy phenyl) methane; 2,2-bis(3,5-dibromo-4-hydroxy phenyl) propane; 2,2-bis(3,5-dimethyl-4-hydroxy phenyl) propane; 1,1-bis(4-hydroxy phenyl) decane; 1,1-bis(4-hydroxy phenyl) cyclododecane; 1,5-bis(4-hydroxy phenyl) pentane; 4,4'-thiol diphenyl; 1,1-bis(4-hydroxy phenyl) cyclohexane; bis(4-bydroxy phenyl) ether; 4,4'-dihydroxy diphenyl; bis(4-hydroxy phenyl) sulfone; bis(3,5-dimethyl-4-hydroxy phenyl) sulfone; resorcinol; hydroquinone; 1,4-dihydroxy-2,5-dichloro benzene; 1,4-dihydroxy-3-methyl benzene; bis(4-hydroxy phenyl) sulfoxide; bis(3,5-dibromo-4-hydroxy phenyl) sulfoxide; 2,2-bis(3,5-dichloro-4-hydroxy phenyl) propane; and 2,2-bis(3,5-dibromo-4-hydroxy phenyl) propane. Currently preferred are dihydric phenols with 2,2-bis(4-hydroxy phenyl) propane being especially preferred.

It is, of course, possible to employ two or more different dihydric compounds or a copolymer of a dihydric phenol with a glycol or with hydroxy or acid terminated polyester, or with a dibasic acid to prepare a carbonate copolymer or interpolymer for use in the preparation of the carbonate polymers of this invention. Also employed in the blends of this invention may be blends of any of the above materials to provide the polycarbonate polymer component.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, di-(alkylphenyl) carbonates such as di-(tolyl) carbonate, di-(naphthyl) carbonate, di-(chloronaphthyl) carbonate, phenyl tolyl carbonate, chlorophenyl chloronaphthyl carbonate or mixtures thereof. The haloformates suitable for use herein include bis-haloformates of dihydric phenols and bis-chloroformates of ethylene glycol, neopentyl glycol, polyethylene glycol and other properties. While other carbonate precursors will occur to those skilled in the art, carbonyl chloride, also known as phosgene, is preferred.

One can also employ thermoplastic randomly branched polycarbonates in the compositions of this invention. These branch polycarbonates may be obtained by the reaction of a dihydric compound, carbonate precursor and a minor amount of a branching agent.

The branching agent is generally a polyfunctional compound containing at least three functional groups which may be hydroxyl, carboxyl, carboxylic anhydride, haloformyl and mixtures thereof. These polyfunctional aromatic compounds are well known in the art. Some illustrative nonlimiting examples of these polyfunctional compounds include trimellitic anhydride, trimellitic acid, trimellityl trichloride, 4-chloroformyl phthalic anhydride, mellitic anhydride and trimesic acid. The amount of these compounds utilized is in the range of from about 0.05 to about 2 mole percent based on the amount of dihydric phenol utilized.

The diene-aromatic vinyl compound-vinyl cyanide resins, hereinafter referred to as ABS-type resins, which form the second component of the present invention are also well known in the art and are commercially available materials. The ABS resin preferably comprises a graft polymer obtainable by polymerizing an aromatic vinyl compound and a vinyl cyanide compound in the presence of a diene rubber. The weight proportion of the diene rubber and the monomeric components is preferred to be 5:95 to 30:70, although no criticality to the relationship between the starting materials exists. The composition of the monomeric components is also not critical and may comprise, for example, an aromatic vinyl compound in a content of 60 to 85% by weight and a vinyl cyanide compound in a content of 40 to 15% by weight on the basis of the total weight of the monomeric components.

Examples of the diene rubber for the ABS graft polymer are polybutadiene, styrene-butadiene copolymer, butadiene-acrylonitrile copolymer and the like. Examples of the aromatic vinyl compounds are styrene, alphamethyl styrene, dimethyl styrene and vinyl toluene. Examples of the vinyl cyanide are acrylonitrile and methacrylonitrile. A currently preferred ABS-type resin is an acrylonitrilebutadiene-styrene graft terpolymer.

For preparation of the ABS polymer, there may be adopted any conventional polymerization procedure such as emulsion polymerization, suspension polymerization, bulk polymerization, solution polymerization, emulsion-suspension polymerization or bulk-suspension polymerization.

The third essential ingredient of the composition of the present invention comprises the polyetherpolycarbonate-polyether ABA-type triblock copolymers. These triblock copolymers are prepared by conventional and well-known processes for the preparation of polycarbonates per se which include, among others, solution polymerization, interfacial polymerization, pyridine process, transesterification and melt polymerization. A convenient process for the preparation of these triblock copolymers is the interfacial polymerization process involving reacting a monohydroxy polyether with phosgene, and subsequently contacting the phosgenated polyether with at least one dihydric phenol or alcohol, a carbonate precursor and an acid acceptor.

In forming the polyether-polycarbonate-polyether ABA-type triblock copolymers which are employed in the practice of this invention, substantially any monohydroxy functional polyether can be utilized. Representative examples of suitable monohydroxy polyethers are ethylene glycol methyl ether, ethylene glycol phenol ether, diethylene glycol methyl ether, propylene glycol methyl ether, dipropylene glycol n-butyl ether, ethylene glycol cyclohexyl ether, ethylene glycol nonyl ether, ethylene glycol dodecyl ether, dipropylene glycol cyclohexyl ether, tripropylene glycol t-butyl ether, tetramethylene glycol pentyl ether and tributylene glycol isopropyl ether. Mixtures of these glycol ethers, for example, a mixture of propylene glycol methyl ether, dipropylene glycol methyl ether and tripropylene glycol methyl ether can be used. Currently, monohydroxy polyethylene glycols are preferred.

The same dihydric phenols and alcohol and carbonate precursor which are employed in forming the basic polycarbonates of the first component of this invention are also suitable for use in forming the ABA-type triblock copolymers.

A suitable acid acceptor may be either an organic or an inorganic acid acceptor. A suitable organic acid acceptor is a tertiary amine and includes such materials as pyridine, triethylamine, dimethyl aniline and tributyl amine. The inorganic acid acceptor may be one which can be either a hydroxide, a carbonate, a bicarbonate or a phosphate of an alkali or alkali earth metal. The preferred inorganic acid acceptor is sodium hydroxide.

The reaction in forming the triblock copolymers of the invention may be facilitated by the use of a catalyst. The catalyst which can be employed can be any of the suitable catalysts that aid the polymerization of an alcohol group with carbonate precursors such as phosgene. Suitable catalysts include tertiary amines such as triethylamine, tripropylamine, N,N-dimethyl aniline, quarternary ammonium compounds such as triethyl ammonium bromide, cetyl triethyl ammonium bromide, tetra-n-heptyl ammonium iodide, tetra-n-propyl ammonium bromide, tetramethyl ammonium chloride, tetramethyl ammonium hydroxide, tetra-n-butyl ammonium iodide, benzyl trimethyl ammonium chloride and quarternary phosphonium compounds such as n-butyl triphenyl phosphonium bromide and methyl triphenyl phosphonium bromide.

The ABA-type triblock copolymers employed in the invention can be produced by conventional solution or interfacial processes known in the art for the manufacture of polycarbonates. The solution process involves reacting, for example, a monohydroxy polyether phosgene in an appropriate solvent such as methylene chloride and contacting the phosgenated polyether with the dihydric alcohol or phenol in the presence of additional phosgene. The reaction mixture may be a single organic phase employing a compatible solvent such as a halohydrocarbon, such as trichloromethane, and utilizing a base such as pyridine or triethylamine to accept the by-product hydrogen chloride. Alternatively, interfacial polymerization techniques may be employed wherein the reactin media is composed of an organic phase and an alkaline aqueous phase. A phase transfer catalyst, that is, an acid acceptor such as triethylamine or sodium hydroxide, may be used to accept the by-product hydrogen chloride from the condensation in the organic phase and to transfer the hydrogen chloride to the alkaline aqueous phase where it is neutralized and the catalyst regenerated to its unprotenated form to accept additional hydrogen chloride.

The solution and interfacial polymerization techniques known in the art from the manufacture of carbonates can be applied equally in forming the ABA-type triblock copolymers.

Any conventional organic solvent that will solvate the product copolymer may be used in making the ABA-type copolymers, so long as the solvent is chemically unreactive in the polycarbonate polymerization. A preferred group of solvents are the chlorinated aliphatic hydrocarbons having from 1 to 4 carbon atoms such as dichloromethane, chloroform, carbon tetrachloride, dichloroethane, trichloroethane, trichloroethylene, tritetrachloroethylene and mixtures thereof. Another desirable class of solvents are the optionally halogenated aromatic hydrocarbons such as monochlorobenzene, dichlorobenzene and mixtures thereof. Preferred solvents are the chloromethanes and especially dichloromethanes. Solvents used in a solution polymerization process are preferably water free so as to avoid side reactions.

The interfacial process utilizes an organic phase and an aqueous phase. In carrying out the interfacial process, it is important that the organic solvent chosen be immiscible with water. The quantity of organic solvent and the concentration of the reactants in the solvent are not critical except that sufficient solvent should be present to dissolve the product polymer and the organic carbonate precursors such as phosgene should be present in an amount sufficient to form the polycarbonate segment of the ABA-type triblock copolymers. An amount of organic solvent sufficient to form a product polymer solution of about 20 weight percent polymer is generally the minimum amount of solvent. The organic phase carbonate precursor such as phosgene generally should be present in stoicheometric amounts with respect to the amount of hydroxyl functionality present both in the monohydroxy polyether and the dihydroxy compound.

The aqueous phase is normally basic to the extent of a pH of at least about 8 and preferably at least about 9 prior to reaction. During reaction, the pH may vary within the range of about 7 to 12, but preferably is kept above 7 by the addition of base such as sodium hydroxide, when needed.

The dihydroxy carbonate forming reactants, in an interfacial polymerization reaction, are provided in the aqueous phase and when neutralized with the base are referred to as bisphenolates. These reactants are normally formed by dissolving the bisphenols in water with an inorganic base, such as an alkali or alkaline earth hydroxide, preferably an alkali metal hydroxide, and most preferably sodium hydroxide. The concentrations of the bisphenolates in the aqueous phase are not critical except that the aqueous phase bisphenolates should be present in an amount sufficient to form the triblock copolymers. The aqueous phase bisphenolates generally should be present in stoicheometric amounts with respect to the phosgenated polyether and the added carbonate precursor such as phosgene. Other materials which do not adversely affect the polymerization reaction may be present in the aqueous phase in addition to the bisphenolates and excess base, such as antioxidants, foam depressants and catalysts.

The process for making the polycarbonates whether by solution polymerization or by interfacial polymerization, may be carried out at ambient temperatures, such as typical room temperature conditions, e.e., 23° to 25° C. Higher and lower temperatures may be employed, taking into consideration the problems of stabilizing and interfacial polymerization at temperatures above or below ambient temperatures. The solution process allows the use of a wide temperature range, with no particular temperature being absolutely critical to making the triblock copolymers. Pressure is not critical so superatmospheric or subatmospheric pressures can be used as well as atmospheric pressure. Reaction time can vary from minutes to as long as several hours.

Preferably, the monohydroxy polyether which is preferentially employed in making the ABA-type copolymers will have a molecular weight in the range from about 300 to about 50,000, preferably 400 to 40,000, and most preferably from 400 to 20,000 with the polycarbonate segment having a molecular weight in the range of 5,000 to 10,000, preferably 10,000 to 20,000, and most preferably 10,000 to 15,000.

The blends of this invention may be prepared by any suitable method of blending. Preferably, the blends are prepared by melt mixing at a temperature above the softening points of the blends using any conventional high shear melt mixing apparatus, including twin screw extruders, single screw extruders and the like. The extrudate can be chopped into pellets and molded using any conventional method of molding including injection molding, roto molding and the like. The word "molding" is meant to encompass all sheet and profile extrusion.

The proportions of the resin components of the composition of this invention are: polycarbonate, 40 to 80% by weight, preferably 50 to 75% by weight; the acrylonitrile-butadiene-styrene terpolymer, 20 to 60% by weight, preferably 25 to 45% by weight; and polyetherpolycarbonate-polyether ABA-type triblock copolymer, 1 to 10% by weight, preferably 2 to 7% by weight, with the total proportion of the three components being 100% by weight. If desired, the compositions of this invention can further contain conventional additives including stabilizers, pigments, flame retardants, elasticizers, ultraviolet absorbants, lubricants and fillers, which are conventionally used as additives for resin compositions. Such additives will be used within the ranges normally employed in the art.

The following example is given to illustrate the preferred embodiment of the invention without limiting it.

EXAMPLE 1

Synthesis of Polyethylene oxide-Polycarbonate-Polyethylene oxide ABA-Type Triblock Copolymer Twenty-five grams nonylphenol initiated polyethylene oxide having a weight average molecular weight of 450 was placed in a reaction vessel containing 1 liter of methylene chloride. Thirty grams phosgene was added to the mixture followed by 9 cc of triethylene. After stirring at ambient conditions for 10 minutes, the mixture was washed with 500 milliliters of water. To a second reaction vessel equipped with a mechanical stirrer, gas in the tube, thermometer, caustic addition pump and vented through a caustic scrubber was added 275 grams of 4,4-bis(hydroxy phenyl) propane, 1500 cc of water and 500 cc of methylene chloride. The mixture was sparged with nitrogen for 5 minutes followed by the addition of 100 grams of 50% aqueous sodium hydroxide. The mixture was cooled at 25±2° C. with an ice water bath while the methylene chloride solution of phosgenated polyethylene oxide from the first reaction vessel was added over 2 minutes. After the addition was complete, additional phosgene was added at 5 grams per minute and a 50% sodium oxide solution was concurrently added at 9 grams per minute. After 23 minutes, 200 grams of 50% sodium hydroxide and 140 grams of phosgene had been added. At this point, 75 grams of 50% sodium hydroxide and 2 cc of triethylamine were added all at once. After stirring for 10 minutes, the brine layer was decanted from the polymerization flask and the organic layer washed with water until free of electrolytes. The polymer was isolated by mixing the methylene chloride solution with twice its volume of acetone in a Waring blender. The powder was separated by filtration and dried in a vacuum oven.

EXAMPLE 2

Evaluation of Polyether-Polycarbonate-Polyether ABA-Type Triblock Copolymers and a Polycarbonate-StyreneAcrylonitrile Graft Copolymer as Compatibilizers for Polycarbonate-Acrylonitrile Butadiene Styrene Blends The effect of the triblock copolymer of Example 1 on the low temperature impact properties of a polycarbonate and ABS blend was evaluated by comparing blends of all three ingredients (Examples B and D) to a blend of ABS and polycarbonate alone (Example A) and to blends of ABS, Polycarbonate and SAN grafted polycarbonate (Examples C and E). A series of blends were prepared having the following compositions:

| Component | A | B | C | D[a] | E[a] |
|---|---|---|---|---|---|
| Polycarbonate | 60 | 60 | 60 | 60 | 60 |
| ABS | 40 | 40 | 40 | 40 | 40 |
| Graft Compatibilizer[b] | 0 | 0 | 5 | 0 | 5 |
| ABA Triblock Compatibilizer | 0 | 5 | 0 | 5 | 0 |

[a] = premixed
[b] = polycarbonate/styrene acrylonitrile graft copolymer

All blends were prepared using a Werner and Pfleider twin screw extruder having a 250° C. barrel temperature. The compatibilizers were evaluated in two ways: (1) simultaneously extruding the polycarbonate, acrylonitrile-butadiene-styrene and compatibilizer and, (2) premixing the compatibilizer with the acrylonitrilebutadiene-styrene by extrusion followed by simultaneous extrusion of the ABS-compatibilizer mixture with the polycarbonate.

The granules obtained from the extrusion process described above were compression molded at 480° F. into Izod test bars. The Izod toughness data was obtained and these bars at ambient temperature and −20° F. The data for polycarbonate-acrylonitrile butadiene-styrene-resin blends with and without compatibilizers is shown in the following table:

| | Izod Toughness | |
|---|---|---|
| Blend | Room Temperature | −20° C. |
| A | 5.3 | 1.4 |
| B | 7.7 | 2.3 |
| C | 7.3 | 2.7 |
| D | 10.8 | 3.4 |
| E | 8.2 | 2.6 |

The data demonstrates the improvement in low temperature impact strength provided by polyetherpolycarbonate-polyether ABA-type triblock copolymers. Low temperature impact properties of such blends (Examples B and D) are at least as good or better than ABS, polycarbonate and SAN grafted polycarbonate blends (Examples C and E) and are certainly superior to those properties for ABS and polycarbonate blends alone.

It is understood that the above is merely a preferred embodiment and that various changes and alterations can be made without departing from the spirit and broader aspects of the invention.

The embodiments of the invention in which an exclusive property or privilege is claimed are defined as follows.

1. A polycarbonate resin composition comprising:
   (a) 40 to 80% of a polycarbonate resin;
   (b) 20 to 60% by weight of a diene-vinyl aromatic-vinyl cyanide terpolymer; and
   (c) 1 to 10% by weight of at least one polyetherpolycarbonate-polyether ABA-type triblock copolymer.

2. A polycarbonate resin composition in accordance with claim 1 wherein the A segments of said ABA-type triblock copolymer comprise a polyether having a molecular weight in the range from 300 to 50,000 and the B segment of said triblock copolymer comprises a polycarbonate having a molecular weight in the range of 5,000 to 30,000.

3. A polycarbonate resin composition in accordance with claim 2 wherein said terpolymer comprises an acrylonitrile-butadiene-styrene graft copolymer.

4. A polycarbonate resin composition comprising:
   (a) 40 to 80% of a polycarbonate resin;
   (b) 20 to 60% by weight of an acrylonitrilebutadiene-styrene graft copolymer; and
   (c) 1 to 10% by weight of at least one polyetherpolycarbonate-polyether ABA-type triblock copolymer; wherein said polyether comprises polyethylene glycol nonyl phenyl ether.

5. The polycarbonate resin of claim 1 in which said polycarbonate is a polybisphenol-A carbonate.

6. A polycarbonate resin composition in accordance with claim 5 wherein the A segments of said ABA-type triblock copolymer comprise a polyether having a molecular weight in the range of 300 to 50,000 and the B segment of said triblock copolymer comprises a polycarbonate having a molecular weight in the range of 5,000 to 30,000.

7. A polycarbonate resin composition in accordance with claim 6 wherein said terpolymer comprises an acrylonitrile-butadiene-styrene graft copolymer.

8. The polycarbonate resin composition comprising:
   (a) 40 to 80% of a polybisphenol A polycarbonate resin;
   (b) 20 to 60% by weight of a acrylonitrilebutadiene-styrene graft copolymer; and
   (c) 1 to 10% by weight of at least one polyetherpolycarbonate-polyether ABA-type triblock copolymer; wherein said polyether comprises polyethylene glycol nonyl phenyl ether.

9. A polycarbonate resin composition comprising:
   (a) 40 to 80% of a polybisphenol A polycarbonate resin;
   (b) 20 to 60% by weight of a diene-vinyl aromatic-vinyl cyanide terpolymer; and
   (c) 1 to 10% by weight of at least one polyetherpolycarbonate-polyether ABA-type triblock copolymer; wherein said polyether comprises polyethylene glycol nonyl phenyl ether.

* * * * *